Sept. 10, 1946.                    E. LABIN                    2,407,287
                              COURSE BEACON
                          Filed June 28, 1941          2 Sheets-Sheet 1

INVENTOR
EMILE LABIN
ATTORNEY

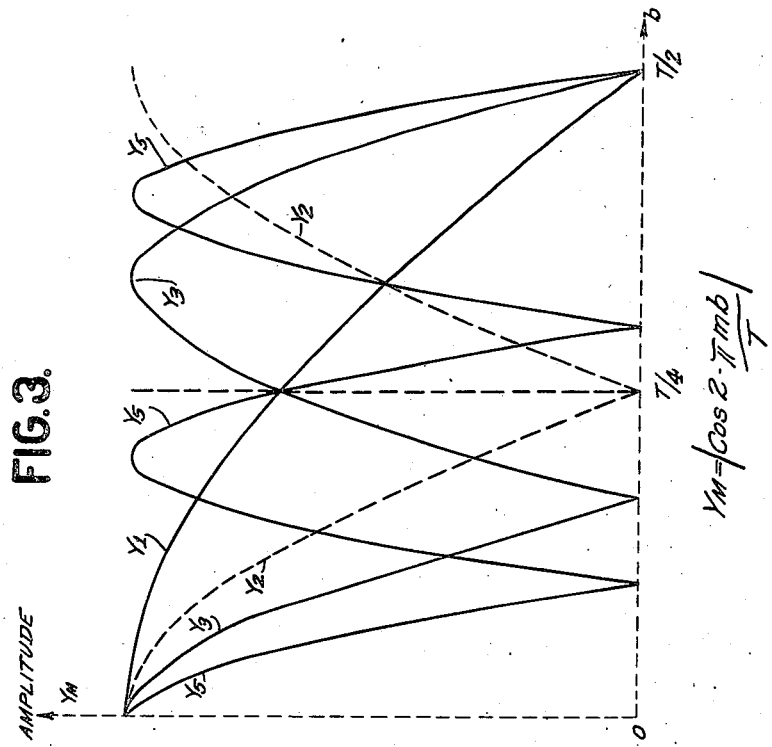
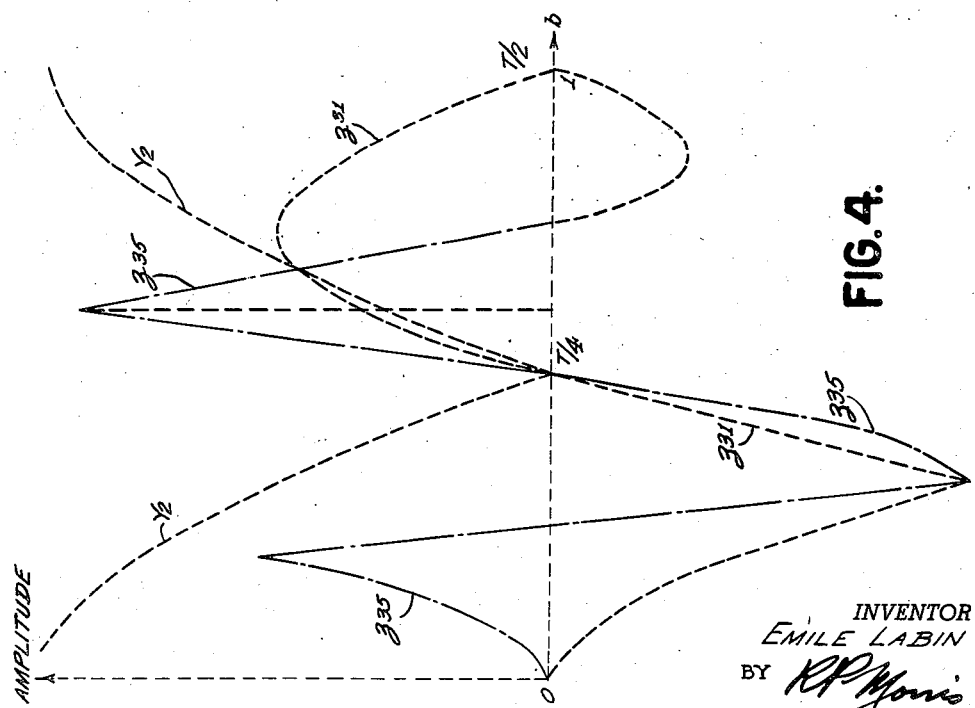

Patented Sept. 10, 1946

2,407,287

UNITED STATES PATENT OFFICE 2,407,287

COURSE BEACON

Emile Labin, New York, N. Y., assignor to Federal Telephone & Radio Corporation, a corporation of Delaware Application June 28, 1941, Serial No. 400,259

14 Claims. (Cl. 250—11)

This invention relates to radio direction-indicating and direction-finding apparatus, and is directed particularly to means for producing an aircraft flight beam of high accuracy.

It is an object of the invention to provide means for producing an airplane course beacon of greater directive accuracy and longer range than has hitherto been attainable.

Another object is to provide an improved radio beacon which will not give distorted and misleading course information due to the presence of reflecting objects.

A further object is to provide improved means for varying the directivity of an airplane course beacon at will.

It is also an object to provide an improved course beacon that does not depend upon antenna directivity for its accuracy.

Other objects and various further features of novelty and invention will hereinafter be pointed out or will become apparent from a reading of the following specification in conjunction with the drawings included herewith. In said drawings—

Figs. 3 and 4 are graphs illustrative of the operation of the arrangement shown in Fig. 1.

The invention is concerned with improved directing apparatus for indicating to an airplane pilot a desired direction of flight with high accuracy.

This novel system contemplates a directive arrangement whereby angular directive accuracy improves with distance from the transmitter and a beam may be projected for distances hitherto unobtainable with accuracy. The system is at the same time further adaptable to changes in directivity.

Such a system will be appreciated as having very definite civil as well as military value. In commercial aviation there is a definite call for a course beacon having great accuracy and substantially unaffected by large reflecting bodies, such as high mountains. The present invention will help to fill such needs.

From a military point of view it is considered desirable to provide a sharply directive beacon that may be readily followed and that is relatively undetectable by the enemy, hence, relatively secret. A pair of such beacons could be projected from spaced points within one territory to intersect at a desired location in another territory and thus very accurately define this desired location, which, say, it is desired to bomb. In order to assure further secrecy these beacons could be varied while the bombers are en route to their objective, and their intersection need only be made to occur at the objective as the bombers are immediately approaching. It would thus be possible to bomb a fixed target with relative accuracy without requiring bombardiers to first see their targets.

In order to obtain increased accurate course range I propose to use pulse modulation transmission means in which a series of impulses of unusually high instantaneous power is transmitted. To establish a course two transmitting antennas are each fed with energy of the same impulse frequency $$\frac{1}{T}$$

but displaced a certain interval of time $b_0$, one series with respect to the other. Along any line extending radially outwardly from the midpoint between these antennas the time interval between receivable pulses will be the same, and thus constant, along that line or course.

Now, if an airplane carries receiving equipment responsive to the time displacement between successive impulses of both these series, it can be given an indication of any course to be followed; that is, the course may be determined by this time interval. I consider it preferable, however, to provide the receiving sets responsive only to one predetermined time interval and then to control the time interval between pulses of both transmitting sources by appropriate phase adjusting means in order to send the aircraft out on a fixed direct, or controlled indirect course.

Figure 1:
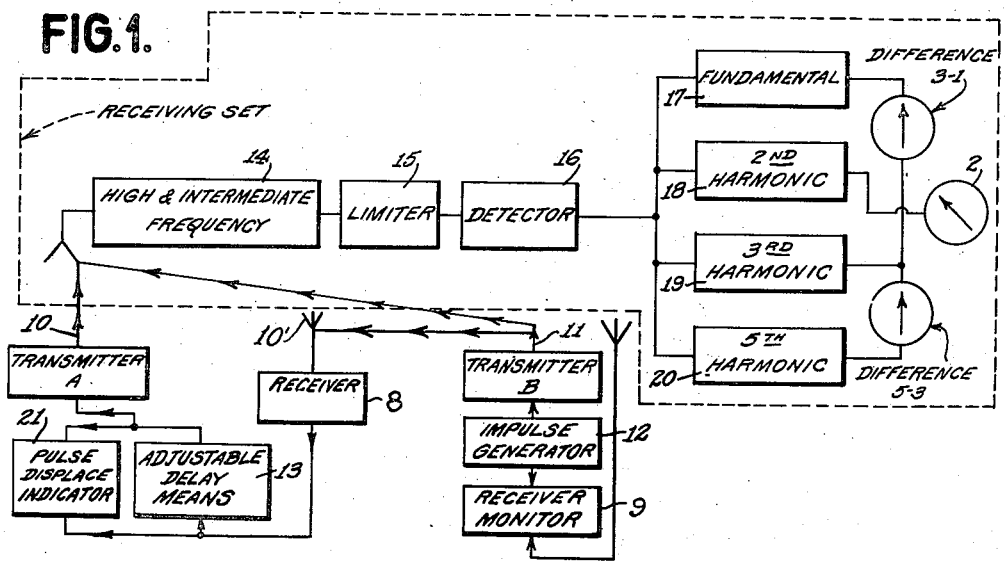
Fig. 1 shows schematically a preferred arrangement and layout of transmitting and receiving apparatus in accordance with features of the invention.

With this brief general introduction, the invention will now be described in connection with the drawings. Fig. 1 schematically shows in block diagram form elements of my novel beacon system, including the transmission and receiving (airplane) stations. In the form shown the transmitting equipment includes a pair of antennas 10 and 11 spaced preferably a substantial distance apart for greater accuracy, as will be clear. Antenna 10 is associated with transmitter A, and antenna 11 with transmitter B. Each of these transmitters is supplied with a periodically recurrent impulse signal spaced in time, one with respect to the other. In a preferred form a single impulse generator 12 is employed for supplying both transmitters, and in substantially the following manner. Generator 12 supplies impulse energy directly to transmitter B. A receiving antenna 10' at station A is receptive to this impulse energy; and, after receiving the pulses in receiver 8 and appropriately delaying the same by time-delay means 13, the impulses are retransmitted at A. A pulse displace indicator 21 receives energy from the receiver 8 and from the output of delay means 13 for comparison indication, whereby the effect of the time delay means 13 can be observed and monitored. If desired, a receiver and monitoring circuit 9 may also be provided at B for ascertaining whether the delay between transmitted impulses from A and B are spaced properly to define a correct course.

Now, along any radial direction from the midpoint between A and B, and particularly at greater distances, received impulse energy will comprise a recurrent pattern of two pulses, spaced in time according to the radial direction. Since any such pulse pattern will have a definite harmonic make up, I propose to employ harmonic analysis at the receiver to give the course indication to the pilot. Accordingly, a preferred form of receiver comprises radio and intermediate frequency stages 14, and limiting and detecting means, 15 and 16, respectively. After detection of the two-pulse signal, for purposes that will later become apparent, I propose to identify by appropriate filter means 17, 18, 19, and 20 various odd-harmonics of the signal in addition to the fundamental and an even harmonic. Information acquired from a differential indication of various voltage outputs of these filters may give a direct indication as to whether the desired course is being followed.

Figure 2:
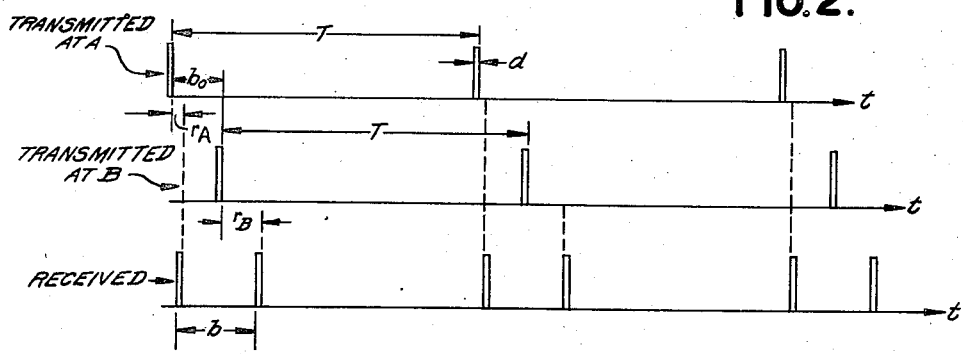
Fig. 2 is a graphical representation of energy characteristics at different positions in the layout of Fig. 1.

Fig. 2 shows schematically the energy output of the respective transmitters and the kind of energy received at the craft that is being guided. Pulses of the same period T are transmitted at A and B and are time-displaced from each other, as so adjusted by the phasing control 13. In transmission from A to the receiver there will be a certain delay $r_A$, and another delay $r_B$ associated with energy coming from B. If the interval between the radiation of a pulse from A and the radiation of the corresponding pulse from B is $b_0$, the total displacement between pulses at the receiver will be $b$, the resultant of controlled and transmission delays—$b_0 - r_A + r_B$. We shall now analyze the received signal, two pulses displaced by an interval $b$.

It may be shown from a harmonic analysis of the received signal $g(t)$ that all frequencies which are multiples of $$\frac{1}{T}$$

will have phase and amplitude characteristics dependent upon the delay of one series with respect to the other, that is, upon the magnitude of $b$. The phase variation may be neglected since the detected harmonics are used only to give currents proportional to the magnitude of their amplitudes. Furthermore, since only lower order harmonics are to be considered, it will be assumed that the duration $d$ of the impulses is small enough for the amplitude of the various harmonics of each series to be independent of the harmonic order. As will be shown in the following paragraph, this assumption is valid no matter what the form of the impulses just as long as they are short enough.

From the Fourier formula the amplitude $A_m$ for the $m$th harmonic of a single series of the transmitted pulses over the period T is given as—

$$A_m = \frac{2}{T}\int_0^T f(t) \cos m\omega t . dt \qquad (1)$$

where $f(t)$ represents the pulse shape. Now, since $f(t)=0$ for values of $t$ between $d$ and T, the integral is limited by $t=d$. However, if $d$ is so small that for all reasonably small values of $m$ $$\cos m\omega d = 1$$

it is found that for all forms of $f(t)$ if $m$ is reasonably small $$A_m = \frac{2}{T}\int_0^T f(t).\cos m\omega t . dt = \frac{2}{T}\int_0^d f(t).dt \qquad (2)$$

that is, for all impulse forms the amplitude of the lower harmonics is equal to the mean value of the periodic function $f(t)$. Thus for a single series of pulses all low harmonics have the same amplitude.

In the case of a double pulse series, however, the different low harmonics will have different amplitudes. The amplitudes of the various harmonics forming the received complex double pulse series will vary simply as $\cos m\omega b$. This will be clear by considering one series of pulses, say from A, as—

$$f_A(t) = \sum A_m . \cos m\omega t \qquad (3)$$

and the other, say from B, as—

$$f_B(t) = \sum A_m . \cos m\omega(t-b) \qquad (4)$$

The combined result of these signals, representing received energy will be—

$$g(t) = \sum 2A_m . \cos \frac{m\omega b}{2} \cos m\omega\left(t - \frac{b}{2}\right) \qquad (5)$$

Since the term $2A_m$ is clearly not dependent on the value of $b$, and since the term $$\cos m\omega\left(t - \frac{b}{2}\right)$$

will vary periodically between $+1$ and $-1$ no matter what value is chosen for $b$ it is clear that the term $\cos(\tfrac{1}{2}m\omega b)$ is the sole term defining the relation of the absolute magnitude of the received energy for any harmonic to the displacement $b$ between pulses.

Fig. 3 is a series of graphical representations showing how the magnitude $Y_m$ of this $$\cos \frac{m\omega b}{2}$$

term varies for a number of the lower order harmonics when $b$ is considered for values of zero to $$\frac{T}{2}$$

It will be observed that all of the odd-order harmonic curves intersect and are thus equal for a delay $b$ of $$\frac{T}{4}$$

between received impulses. Those odd harmonics of the orders $4m+1$ ($m$ being zero or any whole number) will vary with $b$ about $$\frac{T}{4}$$

as a cosine function varies about $$\frac{\pi}{4}$$

that is, with a negative slope; and the odd harmonics of orders $4m+3$ will vary with $b$ about $$\frac{T}{4}$$

as a sine function varies about $$\frac{\pi}{4}$$

that is, with a positive slope. It will be seen, then, that two odd harmonics of successive order may be used to define an axis about $$\frac{T}{4}$$

In accordance with features of my invention I use two such successive harmonics to obtain a differential indication of their relative magnitudes.

In Fig. 4 I show graphically the resultant curves obtained from differential superpositions of such successive odd harmonics of the received signal pattern. In this figure, curve $\zeta_{31}$ represents a quantity proportional to the difference between the third harmonic and the fundamental, and $\zeta_{35}$ the third and fifth harmonic differential. An even harmonic, in the present instance the second $Y_2$, is also shown, as it is employed for purposes that will be later pointed out.

It will be noted in connection with the curves of Fig. 4 that both the differential curves vary in the same sense either side of a norm, where $$b=\frac{T}{4}$$

When time-displacement $b$ of received impulse patterns is greater than $$\frac{T}{4}$$

odd-harmonic differential energy will have positive values; and when these differentials are less than $$\frac{T}{4}$$

resultant energy is negative. It thus appears that if a flight course be determined by a difference $b$ between pulses equal to $$\frac{T}{4}$$

a receiver adapted to filter out harmonics and compare differentials as above-indicated will have zero output whenever the receiver is exactly "on course." Drift to one side will give rise to too large a differential with resultant positive $\zeta$-output, and the converse will hold for drift "off course" in the opposite sense.

Of the many indicating means that will suggest themselves to the reader, I prefer to employ a voltmeter giving visual indication of positive or negative harmonic differential voltage values. In a practical application of this indication system it will be seen that by using only the $\zeta$ or differential curves, it is possible to obtain zero indications for more courses than the true one $$\left(b=\frac{T}{4}\right)$$

In order to eliminate the error of following a false course I propose to employ some additional indication of the value of an even harmonic, say the second, which passes through zero only at $$b=\frac{T}{4}$$

Thus, by simultaneously following the second-harmonic zero and a zero of one of the $\zeta$-curves a pilot will be "on course."

It will further be observed in connection with Fig. 4 that differential curves for higher order harmonics (e. g. $\zeta_{35}$) are of steeper slope at $$b=\frac{T}{4}$$

than lower harmonics. This steeper slope may be utilized as the correct course is approached to give higher magnitude indications in the "on course" neighborhood of $$b=\frac{T}{4}$$

and thus to follow the course still more accurately. On the other hand, when considerably "off course," it may be desirable to employ lower-order harmonic differentials (e. g. $\zeta_{31}$) to eliminate false zeros and to be able to follow down only one slope to get "on course." It thus appears preferable to use the $\zeta_{31}$ and $$|Y_2|$$

indications when the receiver plane is far from the axis, and $\zeta_{35}$ or $\zeta_{51}$ when in the neighborhood of the axis. If $b$ is permitted to vary only within relatively small limits about $$\frac{T}{4}$$

then the $\zeta_{31}$ curve may be employed merely for quadrant identification purposes. Since the maximum variations of $b$ about $$\frac{T}{4}$$

(when $b_0$ has the value $\frac{T}{4}$)

are determined by D, the transmission time between A and B, variation in $b$ may readily be kept down to a small fraction of T by appropriately selecting the pulse period T sufficiently large with respect to the distance between transmitters A and B.

Figure 5:
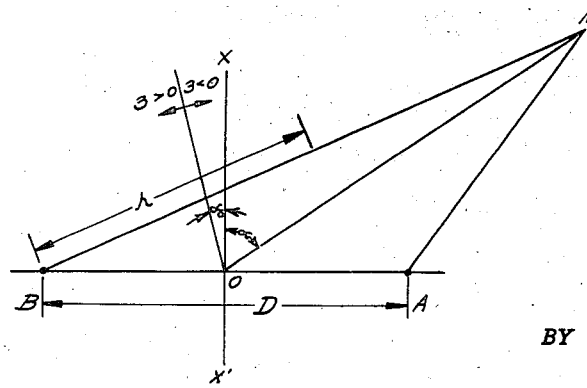
Fig. 5 shows geometrical considerations involved in my novel course system.

Referring to the elementary diagram of Fig. 5, I show the geometrical considerations involved in rotating the direction of the course $$\left(b=\frac{T}{4}\right)$$

without physically displacing antennas 10 and 11. Assuming for the moment that $b_0$ is $$\frac{T}{4}$$

it is clear that unless the receiver is "on course," the detected pulse time displacement $b$ will not be $$\frac{T}{4}$$

but rather some other value equal to $$\frac{T}{4}-r$$

($r$ being the differential $r_A - r_B$, see Fig. 2).

Now, if $\alpha$ designates the angle of OM (i. e. a line joining some point between transmitters A and B to the receiver) measured clockwise from the reference line XOX' (perpendicular to a line between transmitters A and B) then for values of the distance OM very much greater than the distance AB, $$\sin \alpha = \frac{r}{D}$$

where D as above-indicated is the transmission time between A and B. A condition precedent to being "on course" is that $b_0$, the delay instituted at the transmitters by the delay means 13, plus the transmission delay $r$ be equal to $$\frac{T}{4}$$

In order, then, to define a $b_0$ that will produce or set up a course at a desired angle $\alpha_0$ with the perpendicular XOX'

$$\sin \alpha_0 = \frac{r}{D} = \frac{\frac{T}{4} - b_0}{D}$$

In other words, to rotate the direction axis an angle $\alpha_0$ clockwise from the perpendicular, the time between pulses at the transmitter must be—

$$b_0 = \frac{T}{4} - D \sin \alpha_0$$

To this end, the delay means 13 may be used to control $b_0$ and appropriate monitoring and indicating means 21 provided for accurately observing and calibrating course directivity. For purposes of easier calculation and design I prefer to employ a spacing between stations A and B such that the interstation delay D will be some integral sub multiple of the interval $$\frac{T}{4}$$

Since the variation in $r$ incurred in rotating the course axis from OA to OB (i. e. from a position 90° on one side of XOX' to a position 90° on the other side of XOX') is 2D, the minimum value of $$\frac{T}{4}$$

is determined by 2D. Thus $$\frac{T}{D}$$

should equal at least 8 for complete rotation of the course (180°). When the course coincides with XOX', i. e. when the delay $$b_0 = \frac{T}{4} = 2D$$

the peak-to-zero amplitude variation of $f_{35}$ represents approximately a fifth of the interval $$\frac{T}{4}$$

in the B or right-hand quadrant, corresponding to about 23° course variation in this sense. In the A or left-hand quadrant this amplitude variation corresponds to a $b$ decrement of a third of the $$\frac{T}{4}$$

interval—representing 40° angular displacement in that quadrant. It would appear, therefore, that average precision for a 1% indication variation in the $f_{35}$ readings will represent 0.23° course error in the B sector and 0.40° in the A quadrant.

Although I have described my invention in connection with the preferred forms illustrated, it is to be understood, of course, that many modifications will fall within its scope. For example, if it should be deemed inexpedient to provide the impulse generator 12 feeding both transmitters A and B by the method shown, a transmission line arrangement could be employed. In this case generator 12 could feed both transmitters A and B, simultaneously and directly. The above-described delay means could then be provided in the transmission line intermediate the pulse generator and one of the transmitting stations. A monitoring circuit also similar to the one above described could be employed for the same standardizing purposes by disposing it so as to compare the delay between impulse energy fed to both transmitters.

It is further clear that the invention is not to be considered limited to the particular order harmonics described. For example, higher odd harmonics than the fifth may be employed for even greater course accuracy inasmuch as the higher the harmonic order the closer a $f$ peak approaches the true course, and the steeper this $f$ curve's slope at $$b = \frac{T}{4}$$

Although other even harmonics may be employed for the true-course check as above indicated, it is preferred that the second be employed, for this harmonic has the property of only reaching zero once in the entire interval from $$b = 0 \text{ to } b = \frac{T}{2}$$

If a limiter of known construction is employed in conjunction with received energy only the stronger signals, i. e. the impulse energy, will be effective as to the rest of the receiver. In this way it will be possible to eliminate very substantially any reflection or other disturbing effects due to terrain irregularities, as will be clear. Furthermore, since the maximum amount of the impulse displacement that need be used in accordance with the invention is within $$\frac{T}{2}$$

The signal-to-noise ratio in the receiver may further be increased by half-wave rectifying some of the output energy, say from the fundamental filter 17, and employing this rectified energy appropriately to control a blocking signal, as more fully disclosed in my copending U. S. application Serial No. 386,282, filed April 1, 1941.

It is further to be observed that in addition to presenting advantages inherent in pulse modulation, my novel directing system does not require that antennas 10 and 11 be of any particular directive nature. It is preferable that they be of the same general form and character so as each to propagate in substantially the same manner, but they need not be of the directive type. If they are non-directive, it is clear that courses of the same strength may readily be set up in any desired direction without having to make any physical adjustments or alterations in the antennas. A mere single manual adjustment of the delay means 13 is all that is needed.

It is also to be noted that although I have described an arrangement in which course control is effected at the transmitting end, means may be provided whereby the pilot can set his own course for any given relation of transmitted impulses. It is clear that to this end time delay means effective to displace received impulses of a double-pulse signal with respect to each other may be provided at the receiver, and this phase delay means may be adjustable by the pilot. In this way if a single course were defined by a given pulse interval at the transmitters, a pilot could set his course at will with respect to the fixed course by a mere manual adjustment of his phase control means.

Alternately, in what would seem a far simpler arrangement, appropriate adjustable phase displacement network means could be provided in the output circuits of certain filters 17, 18, 19, and 20. Calibrated adjustment of the phase of one odd-multiple frequency with that of another would serve to displace the $b$ value at which a $ \zeta $ or differential curve would have zero magnitude, and hence enable a pilot to set his own course with respect to a standard transmitted impulse interval. The pilot could thus obtain readings exactly as described in the foregoing and follow his course as easily.

It might be mentioned with regard to the latter forms of the invention that they are particularly adaptable when it is desired to send a number of bomber squadrons out on their missions simultaneously. Each pilot would then be able to set his own course with respect to the beacon which may be used by all pilots.

What is claimed is:

1. The method of guiding a mobile unit by signals from a plurality of fixed spaced antennas which comprises generating energy in a periodically recurrent series of relatively short impulses, dividing such energy into a plurality of similar portions, introducing a relative delay between corresponding impulses in said portions, transmitting from each of said antennas energy from one of said portions, simultaneously receiving energy radiated by each of said antennas, filtering said received energy into individual odd-multiple frequencies of said periodical recurrence, and obtaining an indication of the relative magnitudes of the energy of two of said odd-multiple frequencies.

2. The method of guiding a mobile unit which comprises transmitting from a pair of spaced points energy in a periodically recurrent series of relatively short impulses, phase-displacing impulse energy transmitted from one of said spaced points with respect to impulse energy transmitted from the other of said spaced points, simultaneously receiving energy radiated from each of said spaced points, filtering said received energy into individual odd-multiple frequencies of said periodical recurrence, and obtaining an indication of the relative magnitudes of the energy of two of said odd-multiple frequencies.

3. In a course beacon system, a receiver including means for receiving impulse energy, filter means responsive to received impulse energy for singling out individual odd-harmonic components of the impulse frequency, and indicating means responsive to two of said odd-harmonic components for indicating a characteristic of the received impulse energy.

4. In a course beacon system, a receiver including means for receiving impulse energy, filter means responsive to received impulse energy for singling out individual odd-multiple frequencies of the period of said impulse energy, and indicating means responsive to two of said odd-multiple frequencies for indicating a characteristic of the received impulse energy.

5. In a course beacon system, a receiver according to claim 4, in which said indicating means includes means supplying the effective energy of said two frequencies in opposition and means indicating the resultant effective energy.

6. In a course beacon system, a receiver including means for receiving impulse energy, filter means responsive to received impulse energy, said filter means comprising means for singling out the fundamental, third, and fifth harmonics of the impulsing frequency of said received energy, and indicating means responsive to said singled-out frequency energy, said indicating means including means supplying the effective energy of two of said frequencies in opposition and means indicating the resultant effective energy.

7. In a course beacon system, a receiver according to claim 3, in which said filter means further comprises means singling out energy of an even harmonic of the impulsing frequency of said received energy, and means indicating the effective value of said even harmonic energy.

8. In a course beacon system, a receiver according to claim 3, in which said filter means further comprises means singling out energy of the second harmonic of the impulsing frequency of said received energy, and means indicating the effective value of said second harmonic energy.

9. A course beacon system comprising a pair of spaced antenna means, means supplying each of said antenna means with impulse energy of the same impulsing frequency, phase delay means intermediate said supplying means and at least one of said antenna means, whereby impulse energy emitted by one of said antenna means is phase displaced with respect to impulse energy emitted by the other of said antenna means, and receiver means responsive simultaneously to energy emitted by both said antenna means, said receiver means including filter means responsive to received impulse energy and singling out frequencies that are odd multiples of said impulsing frequency and indicating means responsive to two of said odd-multiple frequencies for indicating a characteristic of the received impulse energy, whereby a course indication may be obtained.

10. A course beacon system comprising means for transmitting from a first fixed point energy in a periodically recurrent series of relatively short impulses, means for transmitting from a second point spaced from said first point similar impulse energy phase-displaced with respect to energy transmitted from said first point, means for simultaneously receiving energy radiated from each of said points, and means for obtaining an indication of the relative magnitudes of the energy of two frequency components of said received impulse energy, said components being odd multiples of said periodic recurrence.

11. In a course beacon system, impulse generating means, a pair of spaced antennas, phase delay means responsive to energy from said impulse generating means, means supplying energy from said impulse generating means to one of said antennas, means supplying energy from said phase delay means to the other of said antennas, receiver means including filter means responsive to energy from each of said antennas, said filter means singling out a frequency which is an odd-multiple of the impulsing frequency, and indicating means responsive to the magnitude of said odd-multiple frequency energy.

12. A method of providing a beacon guiding indication along a desired course line by radiation from a first antenna and a second antenna having a predetermined fixed spaced relationship with respect to said course line, which comprises generating energy in a periodically recurring series of relatively short impulses, radiating said energy from said first antenna over an area including the course line and said second antenna, receiving the radiated energy at a point near said second antenna, delaying the received energy, radiating the delayed energy from said second antenna over an area including said course line, the delay being such as to produce a predetermined time spaced relation between the impulses of the energy radiated from said first antenna and said second antenna along said course line, receiving the transmitted pulse energy from both said first antenna and said second antenna at a point within the radiation area of the two antennas, and determining the position of said point relative to said course line by the difference in the time spaced relation of the received impulse energy from said predetermined time spaced relation.

13. In a beacon system, the method of producing a course line identified by impulses of a predetermined time spaced relation according to a selected one of a plurality of radial directions from a given radial center, comprising generating energy in a periodically recurring series of relatively short impulses, radiating said energy over a given area from a first point spaced a predetermined distance from said radial center, receiving the radiated energy at a second point spaced from said radial center and diametrically disposed with respect to said first point, delaying the received energy, radiating the delayed energy from said second point over the area including the area covered by the radiation from said first point to provide impulses of a time spaced relation from said first and said second points to provide a course indication, and adjusting the amount of delay to obtain the time spaced relation from the impulses required for course indication along a selected one of said radial directions.

14. In a beacon system for producing a course line by impulses of a predetermined time spaced relation according to a selected one of a plurality of radial directions from a given radial center, a first antenna and a second antenna arranged in a predetermined fixed spaced relation with respect to said radial center, impulse generator means, first transmitter means for supplying energy from said generator means to said first antenna for radiation of impulses over a given area covering distances considerably greater than the spacing between said first and second antennas, receiver means for receiving impulse energy from said first antenna, delay means connected to said receiver means, a second transmitter means connected between said delay means and said second antenna for transmission of impulse energy from said receiver over an area overlapping said given area, said delay means being adjustable to determine the time spaced relation between the impulses radiated from said first antenna and said second antenna, whereby said impulses indicate for a given delay adjustment a selected course line in a radial direction with respect to said radial center, receiver means for receiving impulse energy from said first and said second antennas, means in said receiver for determining the time spaced relation of impulse energy received, and means responsive to the time spaced relation of the received impulse energy for indicating the relative position of said receiver means with respect to said selected course line.

EMILE LABIN.